United States Patent Office 3,510,815
Patented May 5, 1970

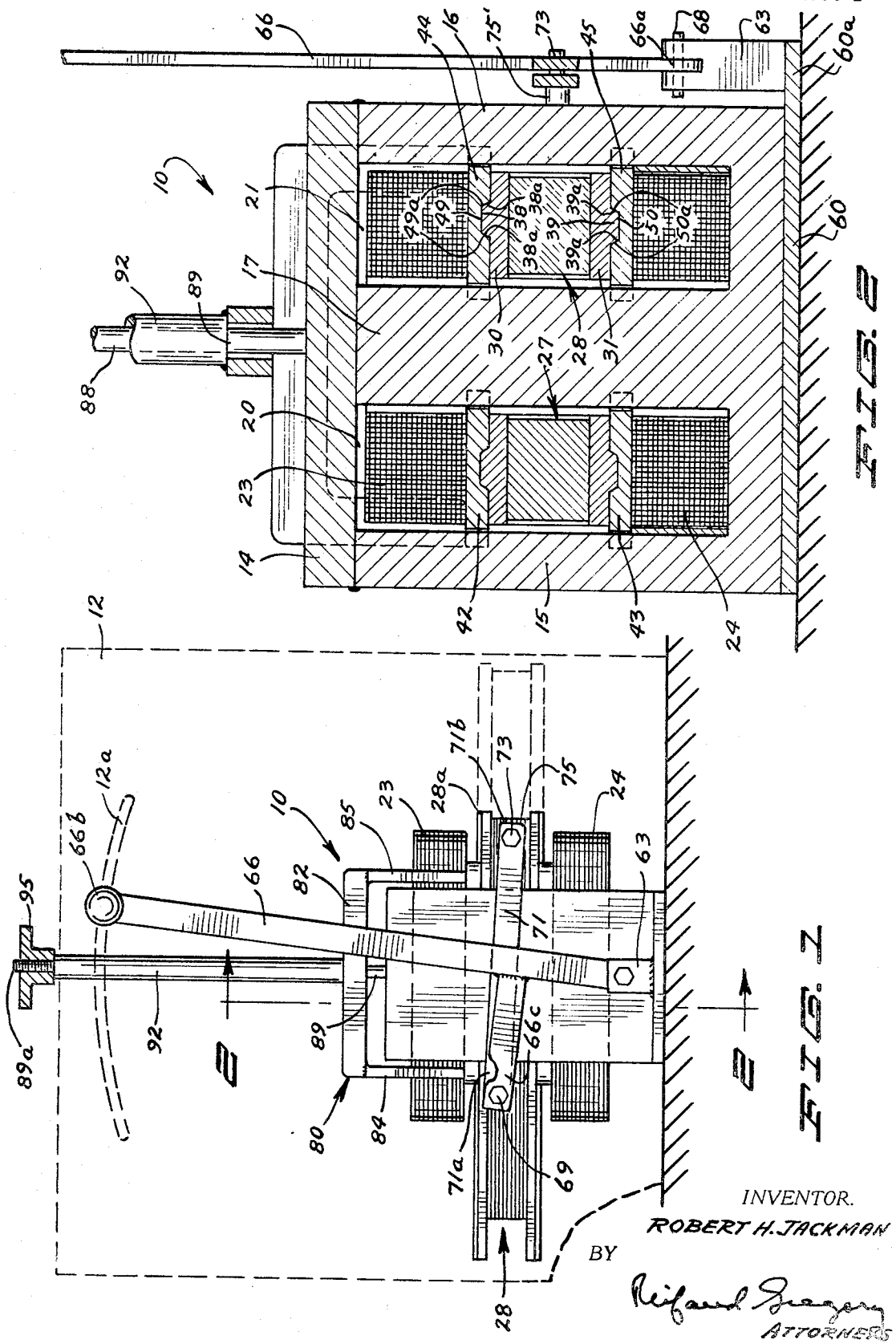

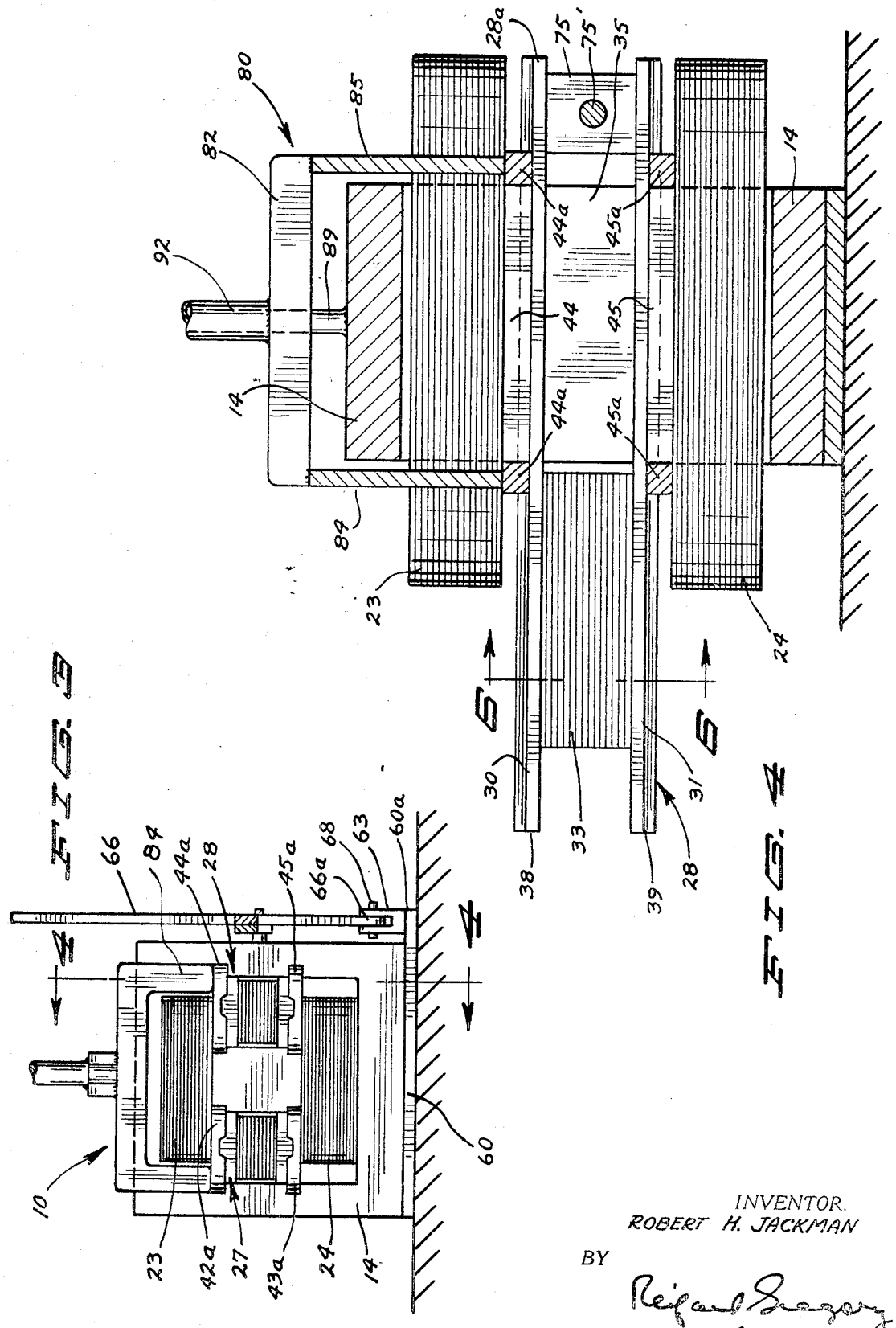

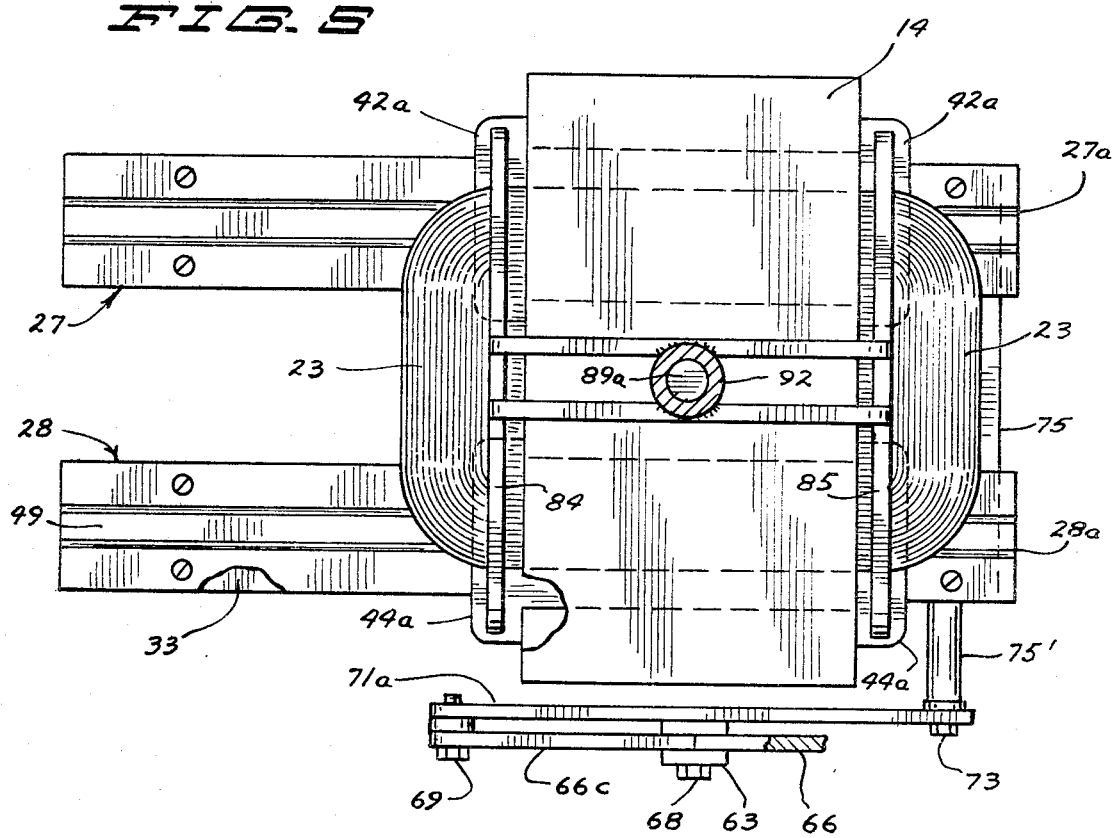
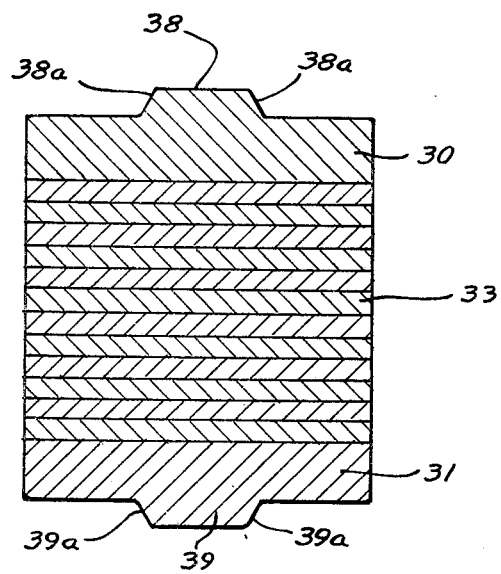

3,510,815
SHUNT SELF-CENTERING APPARATUS
Robert H. Jackman, Crystal, Minn., assignor to Twentieth Century Manufacturing Company, Minneapolis, Minn., a corporation of Minnesota
Filed Apr. 28, 1969, Ser. No. 819,803
Int. Cl. H01f 21/06
U.S. Cl. 336—133                                       5 Claims

ABSTRACT OF THE DISCLOSURE

A shunt type of welder wherein the shunts are carried in sliding shunting members having projecting rails extending in the direction of movement of said members and plate members confining said shunting members and having grooves to receive said rails, said rails and grooves having mating beveled side walls whereby said rails become self-centered within said grooves, and means locking said shunting members between said plate members.

RELATED APPLICATION

Reference is had to my application for U.S. Letters Patent Ser. No. 795,486, filed Jan. 31, 1969, in which other structure is shown for self-centering and locking sliding shunting members.

BACKGROUND AND SUMMARY OF THE INVENTION

In a slidable shunt type of welder there is a tendency for a strong vibratory motion of the shunt resulting from the lateral forces which are present in the operation of the welder. The vibratory motion has a considerable amount of attendant noise. The shunt may be held relatively free of vibration if it can be positioned and held in a null position centered with respect to the coils and the core of the welder.

The purpose of the invention herein is to provide a simple and easily operated means for positioning and holding said shunt in said null position.

Generally stated, the means provided herein for accomplishing the stated purpose comprises a pair of spaced plate members forming a frame having a shunt disposed therebetween, said plate members each having a longitudinal vertical projecting rail, guide members extending through the core of said welder confining said plate members therebetween and having grooves to receive said rails, said grooves and rails respectively cooperating to be self centering and means slidably positioning said plate members and the shunt therebetween and locking the same with respect to the core of said welder.

It is an object of this invention to provide means for self centering the slidable shunt member of a welder with respect to the coils and core of the welder.

It is another object of this invention to lock the slidable shunt member of a welder in a null position to avoid the tendency of it to vibrate.

It is also an object herein to provide a simple locking and unlocking means with respect to the positioning of a sliding shunt member.

These and other objects and advantages of the invention will be set forth in the following description made in connection with the accompanying drawings in which like reference characters refer to similar parts throughout the several views and in which:

FIG. 1 is a view in side elevation with portions thereof and alternate positions of some portions being shown in dotted line;

FIG. 2 is a view in vertical cross section on an enlarged scale taken on line 2—2 of FIG. 1 as indicated;

FIG. 3 is a view in end elevation on a somewhat reduced scale;

FIG. 4 is an enlarged view in vertical section taken on line 4—4 of FIG. 3 as indicated;

FIG. 5 is a top plan view; and

FIG. 6 is a view in vertical cross section on an enlarged scale taken on line 6—6 of FIG. 4 as indicated.

DESCRIPTION OF A PREFERRED EMBODIMENT

With reference to the drawings, the welding structure or welder embodying the invention herein is indicated generally by the reference numeral 10. The invention herein relates particularly to the sliding shunt of said welder and to the means in connection therewith for supporting, centering and securing or locking said shunt.

An external housing 12 is indicated by dotted line in FIG. 1 and its particular configuration is a matter of design.

Said welder is shown here comprising an upright E-type of core 14 conventionally formed as a laminated structure and consisting of outer legs 15 and 16 and a center leg 17, said legs bounding windows 20 and 21.

Conventional primary and secondary coils 23 and 24 are mounted in vertically spaced relation onto said center leg 17. Disposed between said coils and respectively extending transversely through each of said windows are shunting members 27 and 28.

Shunting member 28 comprises a frame of a pair of spaced elongated plate members 30 and 31 having a shunt 33 disposed therebetween adjacent one end portion thereof and having a length substantially the width of said core 14. Said plate members are of such a length that said shunt may be fully withdrawn from and fully disposed within said core. A non-magnetic spacing member 35 is disposed between said plate members for substantially the remainder of their length. Preferably there is a small gap or space between said shunting member 28 and the adjacent walls of said legs 16 and 17 for free sliding movement. Said plate members respectively have outwardly projecting central longitudinal rails 38 and 39 respectively having beveled sides 38a and 39a, said sides preferably being angled at 45 degrees.

Said shunting member 27 has a construction identical to that of said member 27 and the various parts thereof are not here described.

Disposed through said windows 20 and 21 are pairs of plate members 42, 43 and 44, 45 for supporting, centering and locking said shunting members 27 and 28. Said plate members 44 and 45 have said shunting member 28 disposed therebetween with said plate member 44 overlying and being supported by the adjacent underlying portion of the coil 24 and said plate member 45 overlying and being supported by said shunting member 28. Said plate members 44 and 45 respectively have in their facing sides central longitudinal grooves 49 and 50 respectively adapted to receive said rails 38 and 39 and respectively having beveled side walls 49a and 50a within said grooves to mate with the corresponding beveled sides of said rails 38 and 39.

The respective extended end portions 44a and 45a of said plate members 44 and 45 are formed to have transversely projecting side portions or ears to overlie and engage the outer end wall portions of said legs 16 and 17 to retain said plate members within said core 14. Said plate members will be dimensioned to have free vertical movement between said legs 16 and 17. Plate members 42 and 43 are of identical construction to said plate members 44 and 45 having extended end portions 42a and 43a having transversely projecting ears engaging the outer end walls of legs 15 and 17.

Upstanding from an extended side portion 60a of a base plate 60 underlying said core is a bifurcated pivot base member 63 having an upper open ended slot to receive therein the base portion 66a of an elongated upstanding lever 66 and having a pin 68 disposed transversely therethrough to pivotally secure said lever. Said lever will have an appropriate handle 66b at its upper end such as extending through a slot 12a of said housing. With particular reference to FIG. 1, a short arm 66c integral with said lever 66 extends at right angles thereto as illustrated. Pivoted at its end 71a to the end of said short arm 66c by an appropriate pin or pivot member 69 is a second lever arm 71 having its free end 71b secured by an appropriate pivot 73 to an extension 75' of a cross bar 75 which links or connects the adjacent free ends 27a and 28a of said shunting members 27 and 28 for their simultaneous movement. Said bar will be appropriately secured as by screws.

Overlying or bridging said core 14 is a locking member 80 which may be variously formed and is here shown comprising a top web member 82 comprising a pair of transversely spaced bars extending across said core in the direction of said shunting members and having integral with the ends thereof depending inverted U-shaped end wall members 84 and 85 respectively engaging the extended end portions of said plate members 42 and 44 as indicated in the figures.

A rod 88 extends upwardly of the top of said core 14 through said web member 82 and having its lower end portion 89 secured as by welding to said core. Said rod will extend upwardly through said housing 12 and will have a threaded portion 89a at its upper end. Carried on said rod supported by said web 82 and extending upwardly to said threaded portion 89a is a tubular member 92. A hand wheel 95 is threaded onto said rod portion 89a to bear against the upper end of said tubular member.

OPERATION

The shunting members are locked in position by a downward movement of said hand wheel 95 and are loosened by an upward movement of the same.

Said shunting members when loosened are readily positioned longitudinally of said core 14 by the lever 66 with respect to said cross bar 75. Just sufficient tolerance or spacing will be provided by free movement of said shunting members. Once positioned longitudinally of said core they are locked as indicated by operation of said hand wheel 95.

The rails projecting from said shunting members become self centered within their respective mating grooves by means of the engagement of the respective beveled walls of said rails and grooves. Said rails and grooves will be so arranged that said rails in being self centered within said grooves will also be centered with respect to said core to be in a null position with respect thereto. Thus the shuts within said shunting members will be automatically positioned with respect to the transverse currents through the core to be least affected with respect to said currents and the vibratory action which said current tends to set up. Complex adjustment is required in other types of sliding shunt welders in an effort to position the shunts in a null position.

Thus it is seen that I have provided a simple and efficient structure for self centering and locking in position a sliding shunt in a welder of a type within the scope of the structure described herein.

What is claimed is:
1. A shunt centering and locking means for a welding apparatus having in combination,
 a core having a primary and a secondary coil mounted thereon in spaced relation,
 a shunt disposed between said coils,
 a frame having said shunt disposed therein, said frame having an upwardly and a downwardly longitudinally projecting rail,
 said rails respectively having beveled side walls,
 supporting means underlying said frame within said core and having a longitudinal groove therein having beveled side walls mating with the engaging beveled side walls of the lower of said rails,
 means overlying said frame within said core having a longitudinal groove therein having beveled side walls mating with the engaging beveled side walls of the upper of said rails, and
 means carried by said core releasably locking said frame and said shunt therein between said first and second mentioned means, said engaging beveled side walls respectively self centering said frame and said shunt therein.
2. The structure set forth in claim 1, wherein
 said underlying and said overlying means respectively comprise plate members having end portions extending beyond either end of said core and said end portions having transverse projections engaging the outer end walls of said core.
3. The structure set forth in claim 1, wherein
 said last mentioned means comprises a member extending across the top of said core having depending portions engaging said overlying means,
 a rod carried by said core extending upwardly of said last mentioned member,
 means carried by said rod bearing against said last mentioned member, and
 locking means carried by said rod engaging and pressing said last mentioned means against said last mentioned member.
4. The structure set forth in claim 1, and means in connection with said core moving said frame transversely of said core.
5. A shunt centering and locking means for a welding apparatus having in combination,
 a core comprising a center leg having a primary and a secondary coil mounted thereon in spaced relation,
 a window in said core at either side of said central leg,
 a shunt disposed within each of said windows between said coils,
 frames respectively including said shunts each having an upwardly and a downwardly longitudinally projecting rail, said rails having beveled side walls,
 supporting members disposed within said core respectively underlying said frames and respectively having longitudinally extending grooves therein to receive said downwardly projecting rails, said grooves having side walls respectively mating with the engaging side walls of said downwardly projecting rails,
 members disposed within said core respectively overlying said frames and having longitudinally extending grooves therein to receive said upwardly projecting rails,
 said grooves having beveled side walls respectively mating with the engaging side walls of said upwardly projecting rails,
 means moving said frames and said shunts therein transversely of said core between said supporting and said overlying members, and
 means carried by said core engaging said overlying members releasably locking said frames and said shunts therein between said overlying and said supporting members whereby said engaged beveled side walls respectively self center said frames and said shunts therein.

References Cited

UNITED STATES PATENTS

| | | | |
|---|---|---|---|
| 1,098,549 | 6/1914 | Barnum | 336—133 |
| 2,091,366 | 8/1937 | Klinkhamer | 336—133 XR |
| 2,173,735 | 9/1939 | Sola | 336—133 XR |
| 2,265,980 | 12/1941 | Beger | 336—133 XR |
| 3,091,744 | 5/1963 | Owen | 336—133 XR |

THOMAS J. KOZMA, Primary Examiner